United States Patent [19]

Ottesen et al.

[11] Patent Number: 5,729,397
[45] Date of Patent: Mar. 17, 1998

[54] SYSTEM AND METHOD FOR RECORDING DIRECT ACCESS STORAGE DEVICE OPERATING STATISTICS

[75] Inventors: Hal Hjalmar Ottesen; Gordon James Smith, both of Rochester, Minn.

[73] Assignee: International Business Machines Corporation, Armonk, N.Y.

[21] Appl. No.: 999,502

[22] Filed: Dec. 31, 1992

[51] Int. Cl.$^6$ ............................................. G11B 15/18
[52] U.S. Cl. ..................... 360/69; 360/53; 395/183.02
[58] Field of Search .......................... 371/16.5, 29.1; 360/69, 75, 78.04, 60

[56] References Cited

U.S. PATENT DOCUMENTS

| | | | |
|---|---|---|---|
| 4,209,809 | 6/1980 | Chang et al. | 360/53 |
| 4,470,116 | 9/1984 | Ratchford | 364/424.04 |
| 4,682,292 | 7/1987 | Bue et al. | 364/424.04 |
| 4,729,102 | 3/1988 | Miller, Jr. et al. | 364/424.06 |
| 4,772,964 | 9/1988 | Kaida | 360/67 |
| 4,888,652 | 12/1989 | Sander | 360/5 |
| 4,907,109 | 3/1990 | Seino | 360/78.04 |
| 4,922,491 | 5/1990 | Coale | 371/16.5 X |
| 4,979,054 | 12/1990 | McCullough et al. | 360/48 |
| 4,979,055 | 12/1990 | Squires et al. | 360/69 |
| 5,005,088 | 4/1991 | Fukushima et al. | 360/69 |
| 5,056,056 | 10/1991 | Gustin | 395/425 |
| 5,218,504 | 6/1993 | Kimura | 360/69 X |
| 5,235,472 | 8/1993 | Smith | 360/60 |

OTHER PUBLICATIONS

Gaudet et al., IBM Technical Disclosure Bulletin, vol. 11, No. 12, May 1969, p. 1650. "Head Flight Height Monitoring".

*Primary Examiner*—Aristotelis M. Psitos
*Attorney, Agent, or Firm*—Andrew J. Dillon

[57] ABSTRACT

A disk drive includes an error and operating condition tracking mechanism for later analysis. A device controller for the disk drive has access to non-volatile storage. The non-volatile storage is partitioned into one or more areas for storage of condition and error information. A main partition is used for storage of cumulative operating statistics. A secondary partition is used for logging time stamped condition records, with the accumulative count register being used to provide the time stamp. A last in last out partition is used by the device controller to store time stamped error occurrence records for the data storage system.

6 Claims, 6 Drawing Sheets

SYSTEM AND METHOD FOR RECORDING DIRECT ACCESS STORAGE DEVICE OPERATING STATISTICS

BACKGROUND OF THE INVENTION

1. Technical Field

The invention relates to direct access storage devices such as disk drives and more particularly to a system and method for logging operating statistics for disk drives for use in error and warranty violation analysis.

2. Description of the Related Art

A disk drive is an information storage device which utilizes at least one rotatable magnetic disk as a media for information storage. Information is represented on the disk as magnetically polarized regions. Related magnetic regions are arrayed in tracks on the surface of the disk. The tracks may be either concentric or spiral inwardly. Transducers read data from or write data to the a track while the disk moves by the transducer.

The read and write transducer(s) form a portion of a "head" which is attached to a slider. The slider is a carrier body which "flies" just off the surface of the disk when the disk and slider are in relative motion. The slider is attached on its backside to a suspension system which in turn is connected to an actuator arm. The actuator arm is radially positionable and is used to move the head over a desired track during a read or write operation.

The transducer is electrically connected to read and write circuitry. Read circuitry operates to decode pulses in a raw read signal resulting from interaction of the read head and the magnetically polarized regions. Write circuitry generates current pulses to a coil used to set the direction of polarization of the magnetically polarized regions. Successful execution of read and write operations depends upon maintaining close control over slider position, both in terms of being centered over a track and flying at the correct height above the track. In addition, accurate operation of the control, read and write electronics depends upon good control of power levels and operation at temperatures within certain bounds.

Changes in a number of variables can result in loss of control of slider position. The effects of vibration and power level variation are considered first. The face of the slider opposing the disk is called the air bearing surface. The aerodynamics of the slider face provide a high degree of positional stability for the slider in terms of flying height, provided disk rotational velocity is maintained. Lift changes when power supplied to the disk drive motor changes, resulting in changes in disk rotational speed. The suspension system and the actuator arm are designed for low mass to enhance quick movement of the slider between tracks. However, the lateral position of a slider is sensitive to lateral shocks. Exposure of the disk drive to mechanical shock may move the slider off a position centered on a track. Changes in slider fly height or in slider lateral position can effect the read back signal, making it harder to qualify read back pulses related to magnetically polarized regions during read operations and, in write operations, causing mislocated and oversized polarized regions.

Disk drive electronics are sensitive to variations in operating temperature and to changes in power supply input voltage. Silicon based semiconductors have limited temperature operating ranges. Operation above temperatures of about 60° C. can result in error. Operation at excessive voltage levels can result in both error and in permanent damage to the circuitry.

SUMMARY OF THE INVENTION

Other objects, features and advantages will be apparent in the written description of the invention that follows. A secondary data storage system for a host computer system includes a disk drive system having a device controller, at least a first recording medium and a read/write transducer positionable with respect to the recording medium. Write and read back circuitry are connected to the transducer. The write circuitry controls physical alteration of the recording medium through the write transducer to store data. The read back circuitry filters data related components from a read back signal generated by the read transducer and decodes the information represented by the data related components.

The device controller has access to non-volatile storage. The non-volatile storage is partitioned into three areas for storage of condition and error information. A main partition is used for storage of cumulative operating statistics. A secondary partition is used for logging time stamped condition records, with an accumulative count register being used to provide the time stamp. A last in last out partition is used by the device controller to store time stamped error occurrence records for the data storage system.

Errors are recorded as they occur. Condition logging may be prompted by the occurrence of certain operating conditions. Data is stored on the recording medium in a format permitting detection of error. The occurrence of errors and error rates are calculated upon read back and decoding. Excessive error rates result in initiation of condition testing. Out of bound conditions can result in generation of interrupts requiring recordation of operating conditions. Clock controlled time outs or user initiated changes in host data processing system operation may also cause recording of conditions.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

These drawings are not intended as a definition of the invention but are provided solely for the purpose of illustrating one of the preferred embodiments of the invention described below.

DETAILED DESCRIPTION OF THE INVENTION

Figure 1:
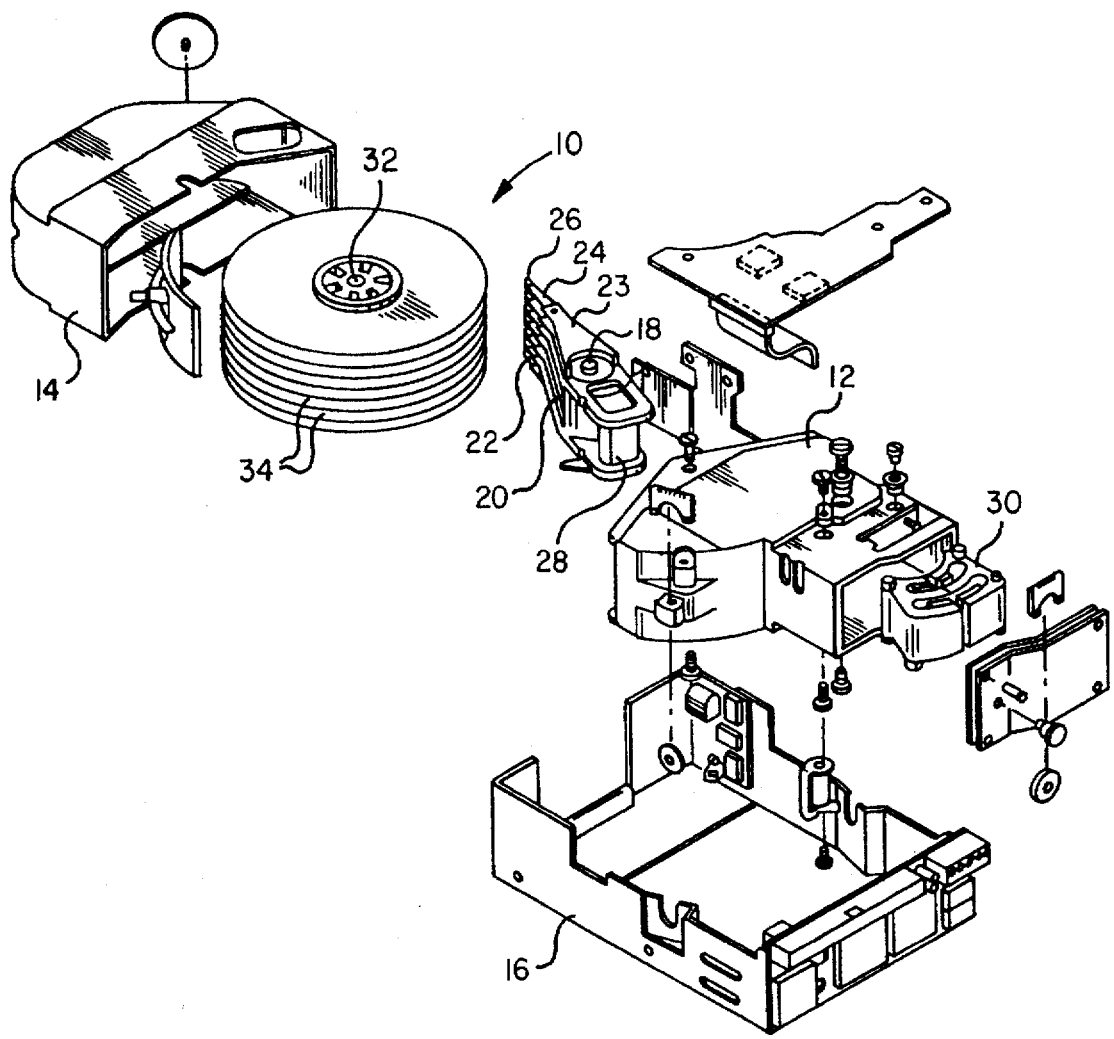
FIG. 1 is an exploded view of a direct access storage device or disk drive.

FIG. 1 is an exploded view of a disk drive 10. It should be noted that although a rotary actuator is shown, the invention described herein is also applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. In this case, the load springs form the suspension. Attached at the end of each load spring is a slider 26 which carries a pair of magnetic transducers or the head. The transducers may be of an inductive type, or may include a read transducer of a magnetoresistive type. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. The disks 34 are attached to the spindle shaft 32 in spaced apart relation. A drive motor 36 (shown in FIG. 2) rotates the disks 34.

Figure 2:
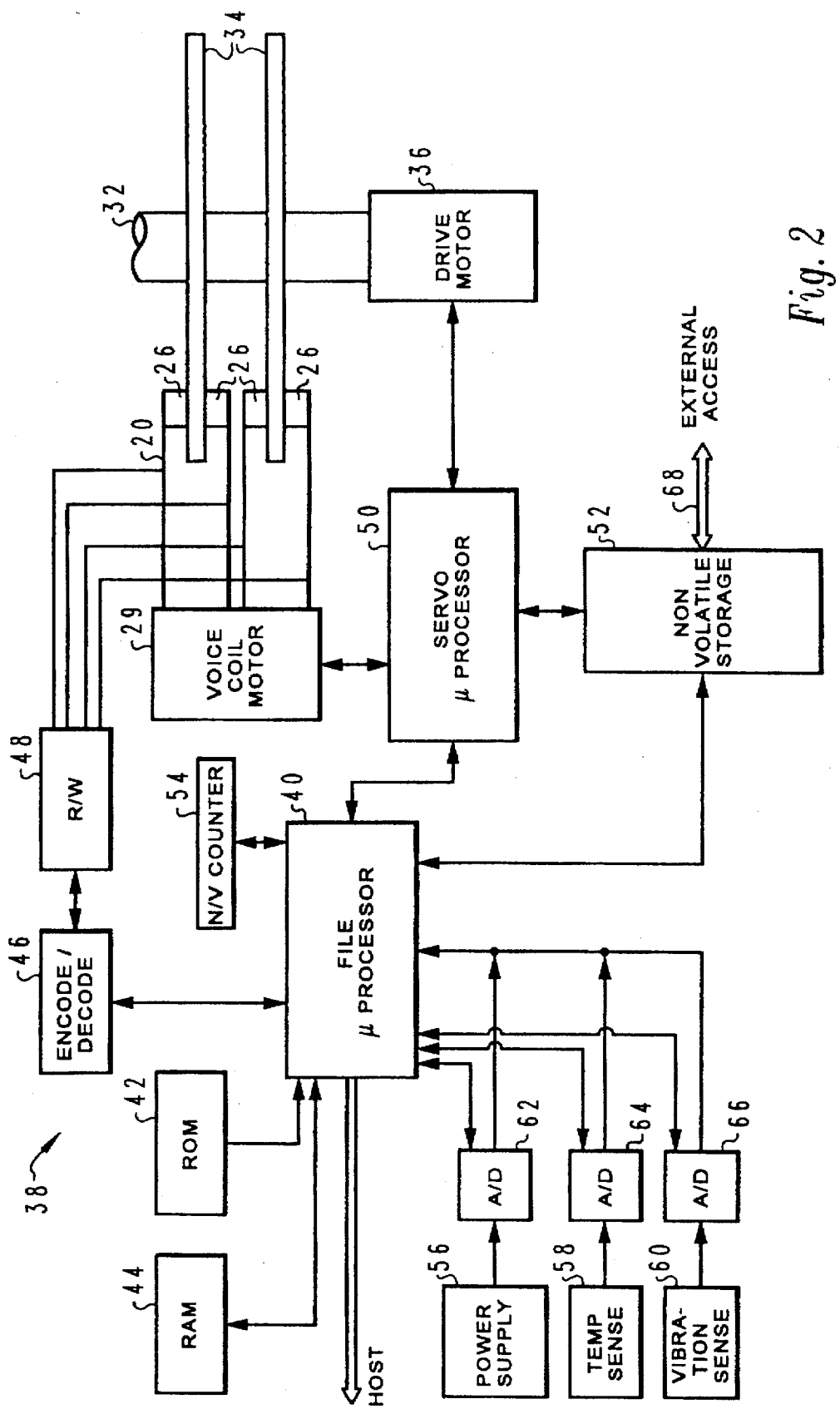
FIG. 2 is a high level block diagram of the control, write and read back components for the direct access storage device of FIG. 1.

FIG. 2 depicts control and data storage circuitry 38 for disk drive 10. Control circuitry 38 is based upon a file controller microprocessor 40. File controller 40, during normal operation, communicates with a host data processing system over a host system data bus. Data is received for storage to disks 34 from the host and retrieved from disks 34 for the host system. File controller 40 handles requests from a host data processing system both for storing data in records and for retrieving data in records in a well known manner. Programs controlling processes executed on file controller 40 are contained in read only memory (ROM) 42. Random access memory (RAM) 44 provides data storage space for use by processes executing on file controller and for buffering data in transit between host and disk drive.

The data channel to and from disk drives 34 utilizes and encode/decode circuit 46 and read/write (R/W) circuitry 48. Encode/decode circuitry 46 communicates directly with file controller 40, and is used, in writing data, to format the bits of data into a sequence of pulses for physical recording. The encode/decode circuitry 46 is used to add parity bits, error correction code, or other redundant data to data fragments, for use in error detection upon recovery. The data are then applied to read/write circuitry 48 to modulate recording signals applied to the plurality of sliders 26. In recovering data, raw read back signals recovered by transducers mounted to sliders 26 are subjected to pulse qualification in read/write circuitry. Encode/decode circuitry 46 is then used to determine whether error exists in the recovered data. File controller 40 can then reassemble the requested record.

A record is stored to and retrieved from known locations on disks 34. It is necessary to move sliders 26 to positions over the tracks on disks 34 which provide these locations. Sliders 26 are positioned by actuation of voice coil motor 29 by a servo microprocessor 50. Servo microprocessor 50 is typically a digital signal processor, which receives track position requests from file controller 40 and translates them into a signal of appropriate intensity and polarity to move the sliders 26 from their current cylinder to the desired cylinder. File controller 40 determines the current cylinder in which sliders 26 are located by interrogation of identification information stored on a track within a cylinder. Servo microprocessor 50 knows from the servo head signal or the sector burst information in a sector servo file the angular position of disks 34. An address for a record is defined in terms of cylinder and angular position. Servo microprocessor 50 returns position information to file controller 40 and supplies access times to non-volatile storage (NVS) 52.

NVS 52 is used for storing operational records of disk drive 10 including, cumulative operating statistics, time stamped operating conditions and records describing occasions of error. NVS 52 is connected to file controller 40 to receive such records. Generation of error records are initiated by, among other factors, an occurrence of error. Indications of error are received by file controller 40 from encode/decode circuitry 46. If data can be recovered it is compared with its associated redundant information to determine if the record is internally consistent. If error occurs recovery may be possible. The error is marked as soft or hard depending on whether recovery is possible. A time stamp for error records is retrieved from a non-volatile (NV) counter 54 which tracks total on time of disk drive 10.

Operating condition records include records for several items. Amplitude measurements of the raw read back signal detected by read/write circuitry 48 are also used in determining clearance of sliders 26 with respect to disks 34 for operating condition records. Supply voltage from a power supply 56 is monitored. Ambient temperature is monitored by use of a thermocouple element 58. An accelerometer 60 is used to provide vibration sensing. Analog to digital converters 62, 64 and 66 are connected between power supply 56 thermocouple 58 and vibration sensor 60, respectively, and file controller 40. Servo access times are monitored by servo microprocessor 50 which provides them to file controller 40. The devices supplying measures of operating conditions may be polled or accessed under a number of circumstances. For instance, they may be polled when the error rate exceeds a minimum threshold, or when a time out condition is reached, or when an interrupt is generated by one of analog to digital (A/D) converters 62–66. Conditions are recorded in a time stamped record stored to NVS 52. Lastly, file controller 40 periodically updates cumulative disk drive statistics on NVS 52.

Figure 3:
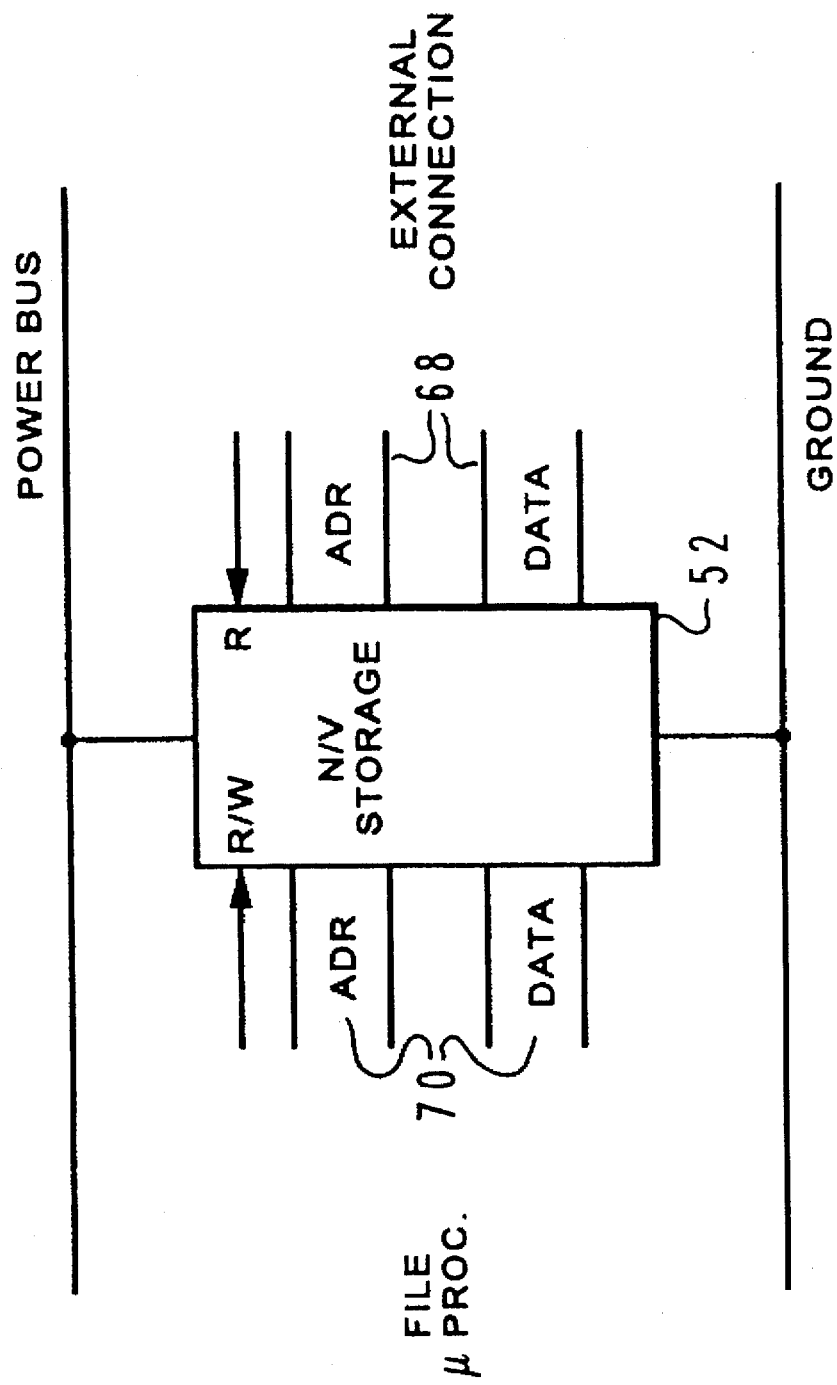
FIG. 3 is a block diagram of connections to a non-volatile storage component for control components of the direct access storage device.

FIG. 3 illustrates connections into NVS 52. NVS 52 is connected between two power rails. An external connection port 68 allows reading the contents of memory registers by providing a read actuation line, a data bus and an address bus. An internal connection 70, which is connected to file controller 40, provided a read/write line, an address bus and a data bus.

Figure 4:
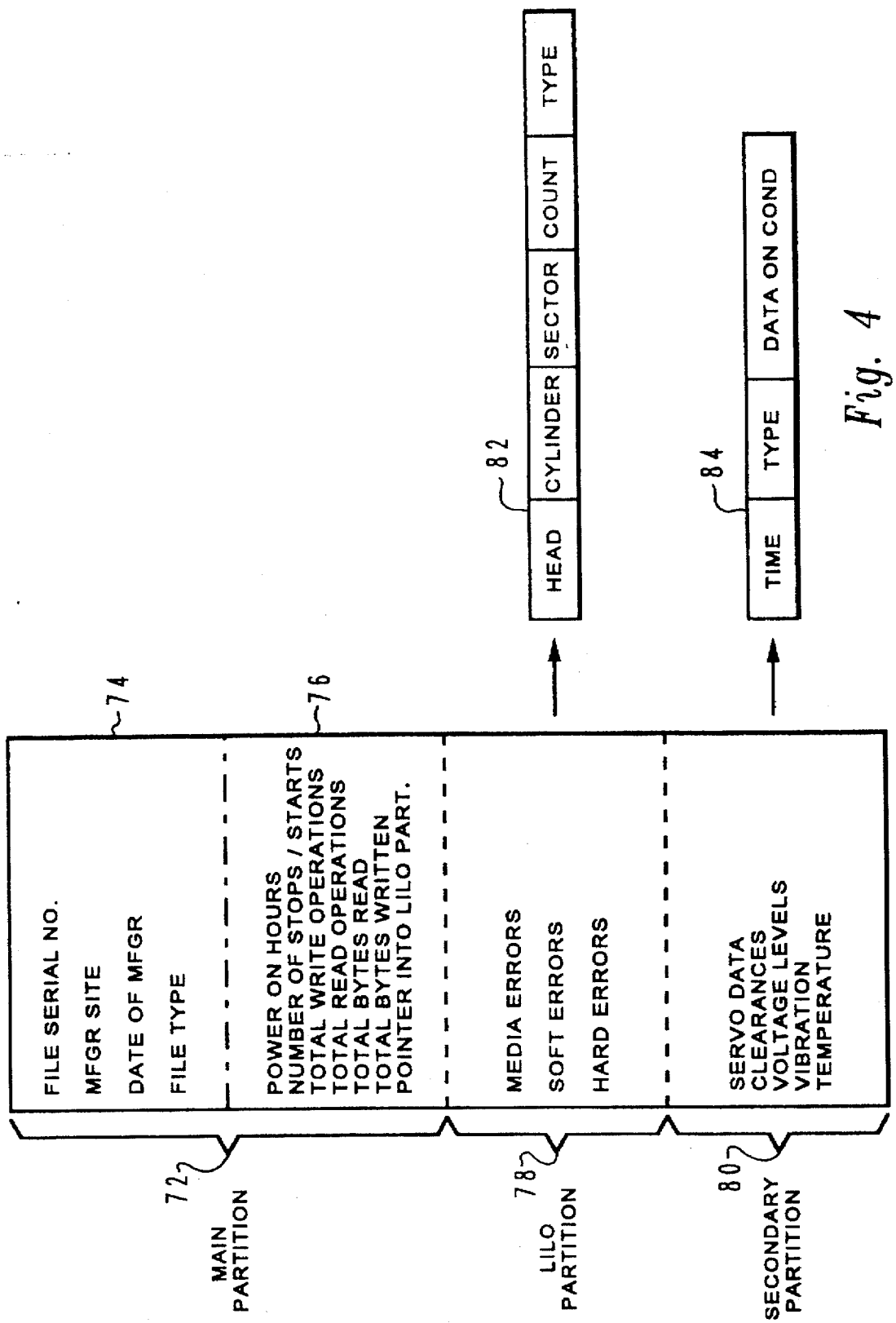
FIG. 4 is a data structure applied to the non-volatile storage component used for logging device conditions within the direct access storage device and the occurrence of error.

FIG. 4 illustrates the internal structure of NVS 52. A main memory partition 72 is divided into two subparts, including a permanent record portion and a cumulative record portion. Records in the main partition are fully defined, except as to value, by their addresses within the partition. Within the permanent record portion 74 are kept the disk drive file serial number, its manufacturing site, its date of manufacture and the file type. Within the cumulative records portion 76 are kept the power on hours, the number of times the disk drive has been turned on, the total number of write and read operations, the total number of bytes of data written and read and a pointer in the last in, last out (LiLo) partition 78.

LiLo partition 78 is used by file controller 40 for the storage of error records. Only the most recent error records are retained from period to period. As records age they are overwritten within the partition if the partition is filled. This is done by providing a pointer into the file which is incremented by one after each record is loaded and which rolls back to the beginning of the partition after all locations have been used. Each error record is in turn directed to the current location indicated by the pointer.

An error record 82 consists of an identification of the head, cylinder and sector which define the location of the record which gave rise to the error indication. A time stamp is part of each record. The type of the error (i.e. media, soft and hard) is also identified. A media error is one known to be associated with a defect on a particular disk 34, A soft error is one which encode/decode circuitry 46 was able to recover from, or which a reread of the disk enabled overcoming. A hard error is an error which the system was unable to correct.

Finally, a secondary partition 80 is used for storage of records of operating conditions for later correlation to particular errors. Conditions for which records are generated include servo data (e.g. access time), clearances, voltage levels, vibration and ambient temperatures. A condition record 84 includes a time stamp, an identification as to type and data describing the condition.

All record types are subject to encryption for security purposes if desired.

Figure 5:
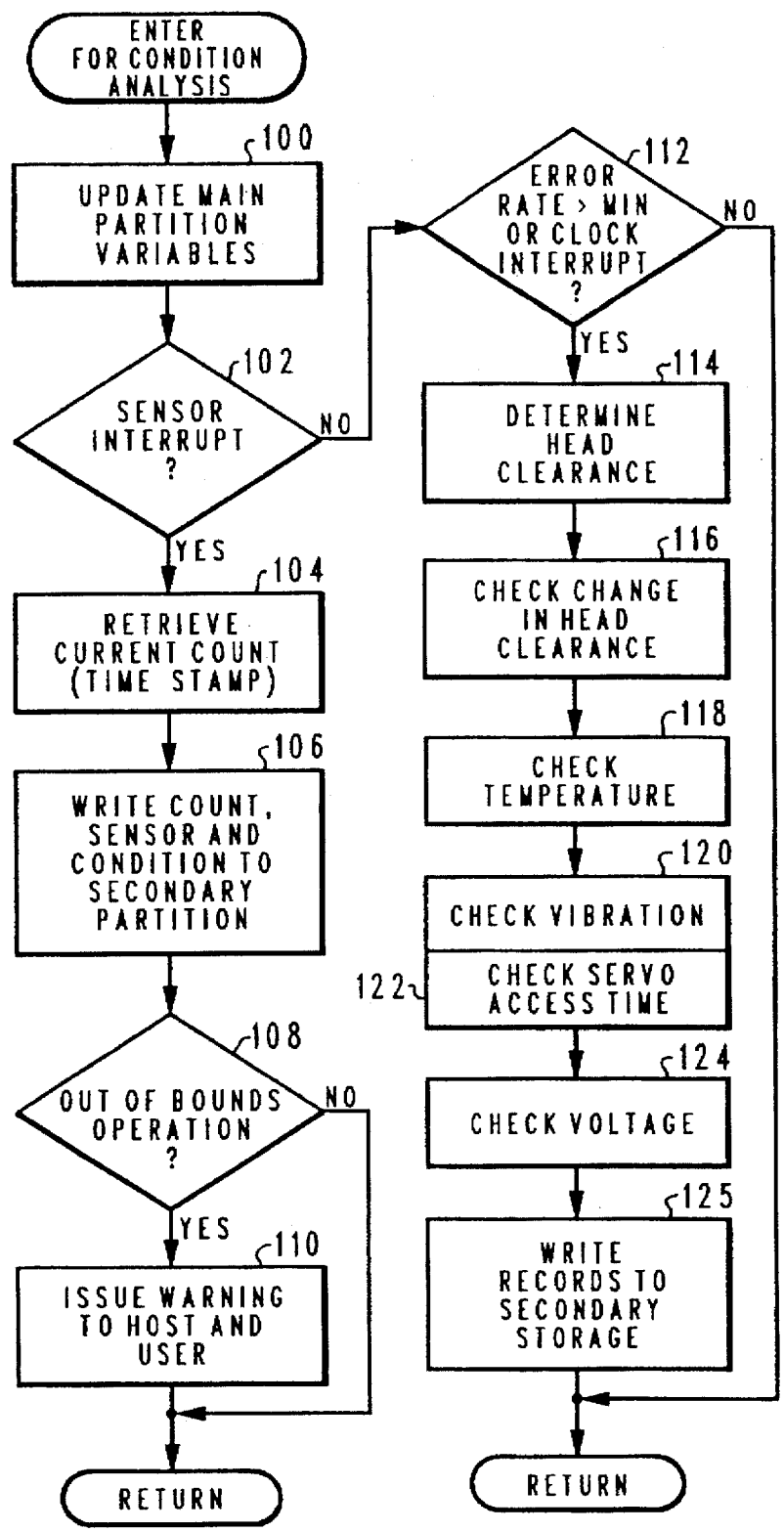
FIG. 5 is a flow chart of a process executed on the microprocessor controller illustrated in FIG. 2.

FIG. 5 is a flow chart of a process executed by file controller 40 in implementing the method of the invention. A condition analysis process is entered at step 100 with an update of cumulative operating statistics in part 76 within main partition 72. At step 102 it is determined if the process was entered upon a sensor interrupt. If yes, step 104 is executed to retrieve the current time (power on time count) for use as a time stamp, if not already retrieved for use in writing the cumulative statistics. Next, at step 106, the time stamp, the sensor value and the condition (identification of the source of the condition measurement) are written to the secondary partition 80. The record may be encrypted. Next, at step 108, it is determined if the condition is one where operation of the disk drive is not recommended. If it is, a warning may be passed to the host (step 110) for issuance to the user. The process then terminates. If the conditions are not outside recommended use areas the process terminates directly after step 108.

If the process was not entered because of a sensor interrupt, the NO branch from step 102 advances the process to step 112. At step 112 it is determined if error rate on read back or a clock interrupt caused the condition analysis process to be initiated. If no interrupt occurred, the process is exited directly. If YES was the result in step 112, step 114 is executed to determine head clearance from a raw read back signal. Step 116 is executed to determine change in head clearance from a previous analysis of operating conditions. Changes in slider fly height may indicate a developing problem.

Then step 118 is executed to check ambient temperature. At step 120 vibration levels are taken, typically by measuring the root-mean square of the amplitudes of the shocks. At step 122 the servo statistics are read from the servo microprocessor 50. At step 124 voltage levels are read. At step 125 the various measurements and determinations are stored to non-volatile storage 72 as operating condition records 84 and the process is exited.

Figure 6:
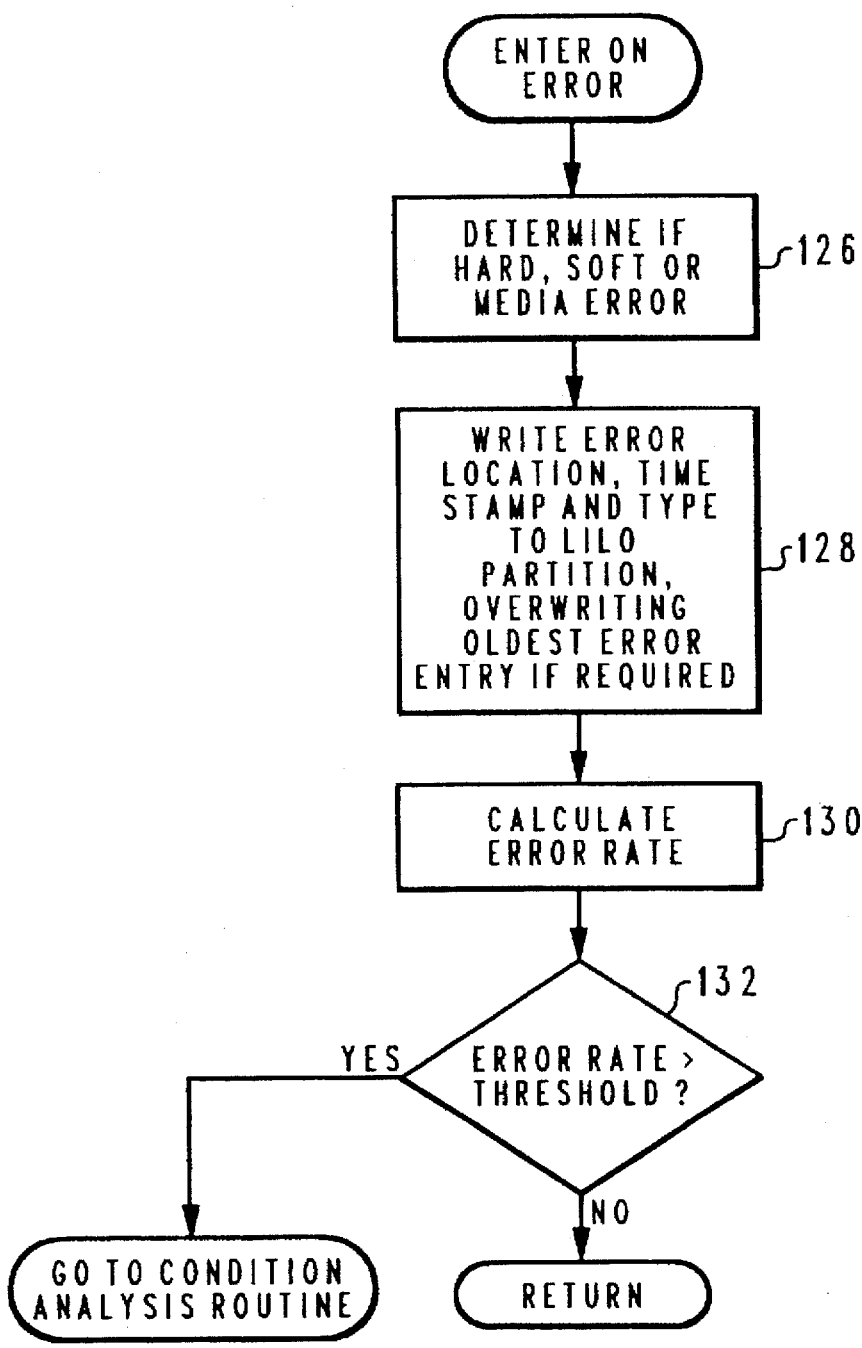
FIG. 6 is a flow chart of a process executed on the microprocessor controller illustrated in FIG. 2.

FIG. 6 illustrates an error record storage process. Entered at step 126, the process receives indication of a hard, soft or media error. At step 128, the error record, including a time stamp, is written to the LiLo partition within NVS 72. The record may be encrypted if desired. At step 130 the error rate is calculated, by taking the number of errors in an immediately preceding time period and dividing it by the time period. If the error rate exceeds a minimum threshold (determined at step 132) processing is passed on to the condition analysis process of FIG. 5. If not, the process is exited.

While the invention has been particularly shown and described with reference to a preferred embodiment, it will be understood by those skilled in the art that various changes in form and detail may be made therein without departing from the spirit and scope of the invention.

What is claimed is:

1. A secondary data storage system for a host computer system comprising:

a rotatable data storage medium;

transducer means positionable with respect to the rotatable data storage medium for physically altering the rotatable data storage medium and for generating a read back signal in response to detection of physical alterations of the rotatable data storage medium;

processing means connected to the transducer means for filtering data from of the read back signal and generating indication of error in the data;

a plurality of operating condition monitoring devices including, means for measuring ambient temperature around the secondary data storage system, means for measuring vibration of the secondary data storage system, means for measuring power supply output voltage, means responsive to the read back signal for determining clearance between the read and write transducer and the recording medium;

a device controller having access to a clock and the plurality of operating condition monitoring devices and receiving indications of error from the processing means for generating a plurality of types of operating records;

a non-volatile, non-moving storage connected to the device controller for receiving the operating records and for storing the operating records sorted by type into partitions of the non-volatile, non-moving storage, the partitions including a main partition for storage of cumulative operating statistics, a secondary partition for logging time stamped operating condition records and a last in last out partition for storing time stamped error occurrence records; and an external connection port to the non-volatile, non-moving storage allowing read access to the partitions while bypassing the device controller.

2. A secondary data storage system as set forth in claim 1, and further comprising servo controller means for positioning the transducer means and wherein the operating condition monitoring devices further include means responsive to the servo controller means for determining access times to records stored on the data storage medium.

3. A secondary data storage system as set forth in claim 2, the device controller further comprising:

means responsive to indication of error in the data for determining an error rate and for interrupting the device controller to poll the measuring means for vibration, temperature and voltage level and the determining means for access time and clearance for condition records if the error rate exceeds a predetermined minimum.

4. A secondary data storage system as set forth in claim 3, wherein the device controller is responsive to the clock or to power up of the storage system for updating the accumulated operating statistics.

5. A method of logging operating statistics for a disk drive unit for use in error analysis, the method comprising the steps of:

clocking power on time of the disk drive unit;

periodically recording power on time in a main partition of a non-volatile, non-moving storage device;

responsive to occurrence of error upon access to a moving media within the disk drive unit, making an error record of such occurrence in a last in last out partition of the non-volatile, non-moving storage including a time stamp, ambient temperature, output voltage for a power supply to the disk drive, mechanical vibration of the disk drive, and clearance between a storage medium and a read and write transducer;

tracking access time periods to locations for data records on the storage medium;

responsive to occurrence of error upon access of the moving media determining an error rate; and responsive to the error rate exceeding a predetermined minimum recording operating conditions for the disk drive to a secondary partition of the non-volatile storage including a time stamp;

accessing the non-volatile, non-moving storage device over an external connection port.

6. A method of logging operating statistics for disk drives for use in error analysis as set forth in claim 5, the method further comprising the step of:

encrypting the records of errors and operating conditions.

* * * * *